US012752623B2

(12) United States Patent
Lee

(10) Patent No.: US 12,752,623 B2
(45) Date of Patent: Oct. 6, 2026

(54) DISPLAY DEVICE AND CONTROL METHOD THEREOF

(71) Applicant: HYUNDAI MOBIS CO., LTD., Seoul (KR)

(72) Inventor: Jung Young Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 289 days.

(21) Appl. No.: 18/193,439

(22) Filed: Mar. 30, 2023

(65) Prior Publication Data

US 2024/0262194 A1 Aug. 8, 2024

(30) Foreign Application Priority Data

Feb. 6, 2023 (KR) ........................ 10-2023-0015570

(51) Int. Cl.

*B60K 35/00* (2024.01)
*B60K 35/22* (2024.01)

(Continued)

(52) U.S. Cl.

CPC .............. *B60K 35/00* (2013.01); *B60K 35/22* (2024.01); *B60K 35/29* (2024.01); *B60K 35/53* (2024.01); *B60K 35/55* (2024.01); *B60K 35/81* (2024.01); *G06F 3/14* (2013.01); *G09F 9/30* (2013.01); *G09G 3/035* (2020.08); *G09G 3/20* (2013.01); *G09G 5/003* (2013.01); *G09G 5/38* (2013.01);

(Continued)

(58) Field of Classification Search

CPC ........ B60K 35/00; B60K 35/22; B60K 35/29; B60K 35/53; B60K 35/81; B60K 2360/195; B60K 35/55; G06F 3/14; G09F 9/30; G09G 3/035; G09G 3/20; G09G 5/003; G09G 5/38; G09G 2300/04; G09G 2310/02; G09G 2310/0243; G09G 2310/0264; G09G 2310/04; G09G 2310/08; G09G 2320/02; G09G 2330/021; G09G 2380/02; G09G 2380/10

See application file for complete search history.

(56) References Cited

U.S. PATENT DOCUMENTS

2018/0010905 A1 1/2018 Wimmer et al.
2021/0206266 A1* 7/2021 Shim .................... B60K 35/223

(Continued)

FOREIGN PATENT DOCUMENTS

KR 2021-0144400 11/2021
KR 20210144400 A * 11/2021 ............. G09G 3/035

OTHER PUBLICATIONS

English Language Abstract of KR 2021-0144400 published Nov. 30, 2021.

(Continued)

*Primary Examiner* — Douglas Wilson
(74) *Attorney, Agent, or Firm* — DLA PIPER LLP US

(57) ABSTRACT

A display device and a control method therefor. The display device includes a casing having an opening, a display unit configured to be inserted into or withdrawn from the casing through the opening, a display mover connected to the display unit and configured to move the display unit, and a controller configured to transfer a signal to the display mover and the display unit. The display unit moves according to a mode so that an area exposed to an outside of the casing differs according to the mode.

4 Claims, 7 Drawing Sheets

(51) Int. Cl.

| | |
|---|---|
| ***B60K 35/53*** | (2024.01) |
| ***B60K 35/55*** | (2024.01) |
| ***B60K 35/81*** | (2024.01) |
| ***G06F 3/14*** | (2006.01) |
| ***G09G 3/00*** | (2006.01) |
| ***G09G 5/00*** | (2006.01) |
| ***G09G 5/38*** | (2006.01) |
| *B60K 35/29* | (2024.01) |
| *G09F 9/30* | (2006.01) |
| *G09G 3/20* | (2006.01) |

(52) U.S. Cl.

CPC ..... *G09G 2300/04* (2013.01); *G09G 2310/02* (2013.01); *G09G 2310/0243* (2013.01); *G09G 2310/0264* (2013.01); *G09G 2310/04* (2013.01); *G09G 2310/08* (2013.01); *G09G 2320/02* (2013.01); *G09G 2330/021* (2013.01); *G09G 2380/02* (2013.01); *G09G 2380/10* (2013.01)

(56) References Cited

U.S. PATENT DOCUMENTS

| | | | | |
|---|---|---|---|---|
| 2022/0172656 | A1* | 6/2022 | Kim | G09G 3/035 |
| 2023/0206860 | A1* | 6/2023 | Lee | G09G 3/3233 |

OTHER PUBLICATIONS

EP Search Report dated Sep. 6, 2023 issued in EP 23170397.6.

European Office Action dated Aug. 1, 2025 issued in EP 23170397.6.

* cited by examiner

DISPLAY DEVICE AND CONTROL METHOD THEREOF

CROSS-REFERENCE TO RELATED APPLICATIONS

Pursuant to 35 U.S.C. § 119(a), this application claims the benefit of earlier filing dates and right of priority to Korean Application No. 10-2023-0015570, filed on Feb. 6, 2023, the contents of which are hereby incorporated by reference herein in their entirety.

TECHNICAL FIELD

The present embodiments relate to a display device and a control method therefor and, more particularly, to a device and method in which a display is movable according to the type of information displayed and an output region of a screen is controlled.

BACKGROUND

A display device may be used for numerous devices as a device capable of displaying various visual information on a display. In particular, a center fascia display of a vehicle displays various visual information about the vehicle. A display device in a vehicle may be installed in a dashboard of the vehicle placed in front of a driver seat and a passenger seat and display various convenient information, such as navigation, vehicle management, manipulation, Internet, and entertainment information.

Such a display used in a vehicle is increasing in size as the amount of information demanded by a user or displayed increases. However, as the size of the display increases, the display blocks the driver's view. In addition, the increased size of the display may cause inconvenience depending on the category of content displayed on a screen or cause unnecessary power loss because content is output on the entire screen.

SUMMARY

An object of embodiments of the present disclosure is to provide a display device that varies an exposure region of a display.

Another object of embodiments of the present disclosure is to provide a method of controlling a screen for an exposure region of a display.

The objects to be achieved by the present disclosure are not limited to what has been particularly described hereinabove and other objects not described herein will be more clearly understood by persons skilled in the art from the following detailed description.

To achieve these objects and other advantages and in accordance with the purpose of the disclosure, as embodied and broadly described herein, a display device includes a casing having an opening, a display unit configured to be inserted into or withdrawn from the casing through the opening, a display mover connected to the display unit and configured to move the display unit, and a controller configured to transfer a signal to the display mover and the display unit. The display unit moves according to a mode so that an area exposed to an outside of the casing differs according to the mode.

The display unit may include a display driver configured to control a plurality of horizontal pixel lines included in a display, the controller may transfer a screen control signal to the display driver, and the display driver may control image output of the horizontal pixel lines based on the screen control signal.

The screen control signal may include an active period and an inactive period, the display driver may apply a voltage to a horizontal pixel line based on the screen control signal of an active state, and a starting point and a duration of the active period differ according to the mode.

The active period or the inactive period of the screen control signal may be based on a synchronization signal, and the synchronization signal may be a signal indicating an order of image data.

The active period of the screen control signal may be started based on the synchronization signal. The duration of the active period of the screen control signal may differ to the mode. The duration of the active period of the screen control signal may be calculated based on a scan rate The active period and the inactive period of the screen control signal may be repeated over time, and the active period may be calculated based on a scan rate, n, represented in Hertz.

The screen control signal may have a different ratio of the duration of the active period to a duration of the inactive period in one cycle according to the mode. The duration of the inactive period of the screen control signal may be less than eight times the duration of the active period of the screen control signal.

All or part of a plurality of horizontal pixel lines may be activated according to the mode. The number of horizontal pixel lines deactivated may be less than eight times the number of horizontal pixel lines activated.

In another aspect of the present disclosure, a method of controlling a display device includes receiving a mode signal of a user by a controller, transmitting a movement control signal corresponding to the mode signal to a display mover by the controller, and transmitting a screen control signal corresponding to the mode signal to a display unit by the controller.

The screen control signal may include an active period and an inactive period, and the active period or the inactive period may be based on a synchronization signal indicating an order of image data.

The method may further include moving the display unit based on the movement control signal by the display mover. The moving the display unit may further include determining a position of the display unit based on a value measured by a sensor, driving a motor based on the movement control signal, and determining whether the display unit is moved according to the movement control signal based on the value measured by the sensor.

According to any one of embodiments of the present disclosure, a variety of modes for a display may be selected, thereby increasing the utilization of a display device.

In addition, according to any one of embodiments of the present disclosure, the exposure range of a display is configured for each mode and content is displayed in an exposed screen region, thereby improving the visibility of information.

In addition, according to any one of embodiments of the present disclosure, unnecessary power loss in a display region that is not exposed may be reduced.

The effects that are achievable by the present disclosure are not limited to what has been particularly described hereinabove and other advantages not described herein will be more clearly understood by persons skilled in the art from the following description.

DETAILED DESCRIPTION

Figure 1A:
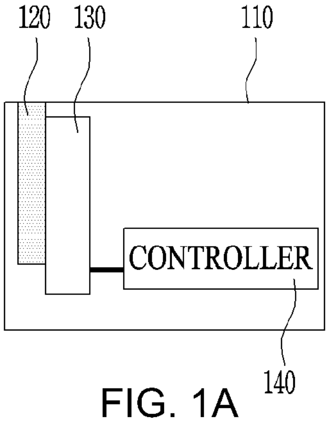
FIGS. 1A-1C illustrate a display device according to a mode according to an embodiment of the present disclosure.

Advantages and features of the present disclosure and methods to achieve the same will be apparent from the following detailed description of embodiments taken in conjunction with the accompanying drawings. The present disclosure may however, be exemplified in many different ways and should not be construed as being limited to the examples disclosed herein. Rather, these examples are provided so that this disclosure will be through and complete, and will fully convey the concepts of the present disclosure to those of ordinary skill in the art, and the present disclosure is only defined by the accompanying claims and equivalents thereto.

The terms used in the present specification are used in order to describe embodiments, but are not intended to limit the scope of the present disclosure. As used in the present specification, a singular form may also include a plural form, unless otherwise defined contextually. Moreover, "comprise" and/or "comprising" does not exclude the presence of one or more of other elements. Like numbers refer to like elements throughout the specification. As used herein, the term "and/or" includes any and all combinations of one or more of the associated listed elements. In the present specification, terms such as "first" or "second" are used in order to describe a variety of elements, but it is apparent that such elements should not be limited to the scope of terms. The terms are used solely for the purpose of distinguishing one element from another. Accordingly, it is apparent that a first element mentioned hereinbelow could be termed a second element, without departing from the scope of the present disclosure.

Unless otherwise defined, all terms (including technical and scientific terms) used herein have the same meaning as commonly understood by one of ordinary skill in the art to which the present disclosure belongs. Terms, such as those defined in commonly used dictionaries, are not to be interpreted in an idealized or overly formal sense unless expressly so defined herein.

Spatially relative terms, such as "below," "beneath," "lower," "above," "upper," and the like, may be used herein to easily describe the correlation between one element and another element as illustrated in the figures. The spatially relative terms should be understood as encompassing different orientations of elements in additional usage or operation of the orientations illustrated in figures. For example, when an element illustrated in the figures is turned over, the element described as disposed "below" or "beneath" another element may be disposed "above" the other element. Accordingly, the exemplary term "below" or "beneath" may encompass orientations of both below and above. The element may be oriented in other orientations, and the spatially relative terms used herein may be interpreted accordingly.

FIGS. 1A-1C and 2 illustrate a display device in accordance with an embodiment of the present disclosure (referred to hereinafter as a "display device") according to a mode.

Figure 1B:
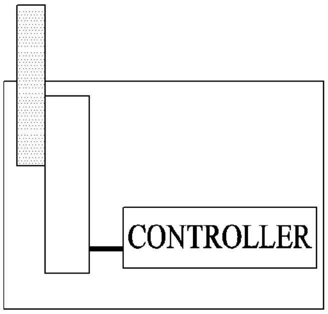
Figure 1C:
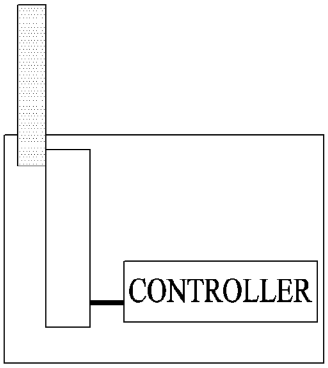

FIGS. 1A-1C illustrate the interior of a display device 100 viewed from the side of the display device 100. In FIGS. 1A-1C, components that the display device 100 contains are illustrated so that the display device 100 may control a movement range of a display unit 120 according to a withdrawal mode. The components of the figure are illustrated in a schematic configuration to aid in understanding the embodiment of the present disclosure. The display unit 120 may be externally withdrawn from a casing 110 via an opening of the casing 110 or may be internally inserted into the casing 110. The display unit 120 may output various information on a screen thereof and may include a combination of various parts related to output of information. A left direction of the figure is a front direction in which the screen of the display unit 120 is shown.

Figure 2:
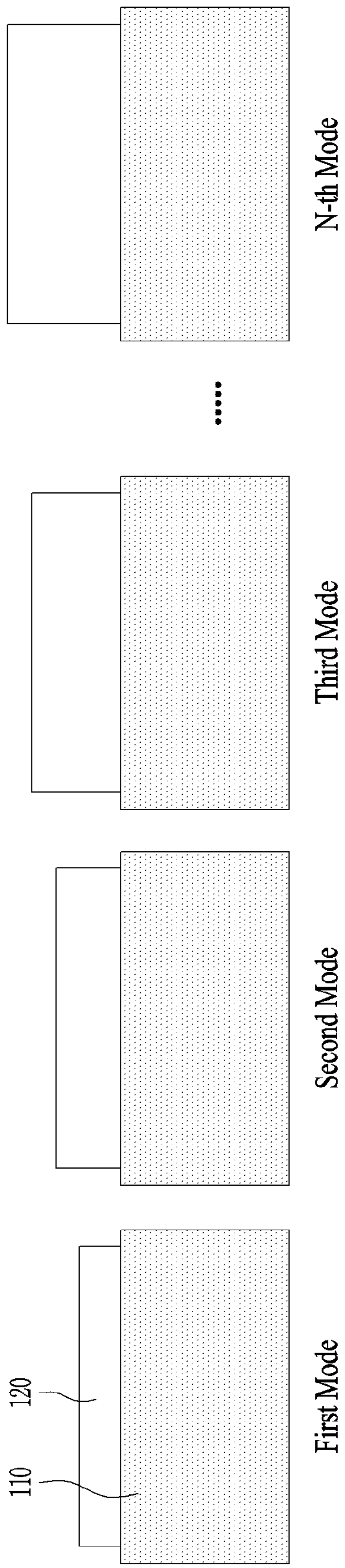
FIG. 2 illustrates a display device according to a mode according to an embodiment of the present disclosure.

FIG. 2 illustrates an outer appearance of the display device 100 viewed from the front of the display device 100. A withdrawn degree of the display unit 120 differs according to a withdrawal mode.

Referring to FIGS. 1A-1C and 2, the display device 100 includes the casing 110, the display unit 120, a display mover 130, and/or a controller 140.

The casing 110 provides a storage space of an appropriate size and shape so that other components of the display device 100 may be located therein. In addition, the casing 110 is provided with an opening, and the opening may be a passage through which the display unit 120 passes inside and outside of the casing 110.

The display unit 120 includes a display that outputs image data on the screen. The display unit 120 may be a module including the display, such as a liquid crystal display (LCD), a light emitting diode (LED), an organic light emitting diode (OLED), or a plastic OLED (POLED). The display unit 120 may be externally withdrawn from the casing 110 or internally inserted into the casing 110, through the opening of the casing 110. The withdrawal degree of the display unit 120 may vary depending on the withdrawal mode. Therefore, the area of the display unit 120 exposed to the exterior of the casing 110 differs according to the withdrawal mode. That is, the size of the screen shown to a user may be different according to the withdrawal mode.

For example, in a first mode, a part of the screen of the display unit 120 may be pulled out from the casing 110, and in the case of an N-th mode, the entire screen of the display unit 120 may be pulled out from the casing 110. The number of withdrawal modes and the exposure range of the display unit 120 corresponding to each withdrawal mode may be appropriately designed by those skilled in the art.

The display device 100 may effectively utilize the display unit 120 by properly withdrawing the display unit 120 by selection of the user. If the amount of information displayed on the screen is small, the display device 100 may partially withdraw the display unit 120, and if the amount of information displayed on the screen in large, for example, if navigation, gaming, etc., are displayed on the screen, the display device 100 may entirely withdraw the display unit 120. Since the display unit 120 may be withdrawn in consideration of the amount or use of information displayed in the display unit 120, the display device 100 may improve user convenience. In addition, the display device 100 may reduce power consumption by outputting information only in a region of the withdrawn screen of the display unit 120.

The display mover 130 is connected to the display unit 120 to move the display unit 120. The display mover 130 may detect the movement of the display unit 120 by a motor (not shown), a gear assembly (not shown), and a sensor and move the display unit 120 to an appropriate position according to the mode.

The motor and the gear assembly transfer the power of the motor to move the display unit 120. The gear assembly may represent an assembly structure of various gears (a worm gear, a worm wheel, a spur gear, a rack gear, etc.) connected to the motor. The motor and the gear assembly may be connected to the display unit 120 to slide the display unit 120 in a straight direction. As illustrated in FIGS. 1A-1C and 2, the display unit 120 may move straight in an upper and lower direction by the operation of the display mover 130. Various connection schemes may be applied to a connection structure between the motor and the gear and to a connection structure between the motor, the gear, and the display unit 120 by those skilled in the art.

The display mover 130 according to the embodiment may move the display unit 120 in a manner different from the scheme illustrated in FIGS. 1A-1C. For example, if the display unit 120 is a flexible type, the display mover 130 may be composed of a motor, a gear assembly, and a rotating drum to wind the display unit 120 on the outer circumferential surface of the rotating drum. Thus, the display mover 130 may drive the rotating drum to insert or withdraw the display unit 120 into or from the interior of the casing 10. Alternatively, when the display unit 120 is a foldable type, the display mover 130 may be driven by folding or spreading the display unit 120 according to the mode.

The sensor may measure the distance between the display unit 120 and an inner wall of the casing 110. The sensor may include a known sensor such as an ultrasound sensor, an infrared sensor, a lidar sensor, a radar sensor, or a camera sensor.

The sensor may be connected to one point of the display unit 120 and measure the distance to one point of the inner wall of the casing 110 by generating a signal in a direction parallel to a moving direction of the display unit 120. For example, in FIGS. 1A-1C, the sensor may be connected to a lower end of the display unit 120 and measure a distance D1 to the inner wall of the lower part of the casing 110 parallel to the moving direction (vertical direction) of the display unit 120.

When the display unit 120 moves up and down, since the value of the distance D1 measured by a sensor changes, the movement of the display unit 120 may be controlled using the value measured by the sensor. For example, the controller (or head unit) 140 of a vehicle may control the withdrawal range of the display unit 120 by controlling the display mover 130 according to the sensor measurement value based on a withdrawal mode signal according to selection of the user.

In another embodiment, the sensor may be connected to the inner wall of the casing 110 and measure the distance to one point of the display unit 120 in a direction parallel to a movement direction of the display unit 120. For example, the sensor is connected to the inner wall of the lower part of the casing 110 and measures the distance D1 to one point of a lower end of the display unit 120 in a vertical direction, which is the movement direction of the display unit 120. Therefore, the value measured by the sensor differs according to the upper and lower movement of the display unit 120, and the movement of the display unit 120 may be controlled based on the value measured by the sensor.

Multiple withdrawal modes may correspond to measurement value sections of the sensor. For example, a sensor measurement value of 0 mm to 50 mm may correspond to a first mode, a sensor measurement value of 50 mm to 100 mm may correspond to a second mode, a sensor measurement value of 100 mm to 150 mm may correspond to a third mode, and a sensor measurement value of 150 mm to 200 mm may correspond to a fourth mode. Therefore, if a sensor measurement value is 120 mm, the withdrawal mode of the display unit 120 may be confirmed to be the third mode. The number of withdrawal modes and the sections of the measurement values corresponding to the withdrawal modes according to the embodiment may be arbitrarily set by those skilled in the art.

As another embodiment, the sensor is connected to the rear surface of the display unit 120 and measures a distance in a direction perpendicular to the movement direction (upper and lower direction in the figure) of the display 120. That is, the sensor may measure a distance D2 to the inner wall of the casing 110 in a direction perpendicular to the rear surface of the display unit 120. In this case, the inner wall of the casing 110 may be provided with a shape to gradually change the value of D2 measured according to the movement of the display unit 120. The distance D2 represents a horizontal distance between the sensor located at the rear surface of the display unit 120 and the inner wall of the back of the casing 110.

As another embodiment, the sensor is located at the inner wall of the back of the casing 110 and measures a distance in a direction perpendicular to the movement direction (upper and lower direction in the figure) of the display 120. That is, the sensor may measure the distance D2 to the inner wall of the back of the casing 110. In this case, the rear surface of the display unit 120 may be provided with a shape to gradually change the value of D2 measured according to the movement of the display unit 120.

Figure 3:
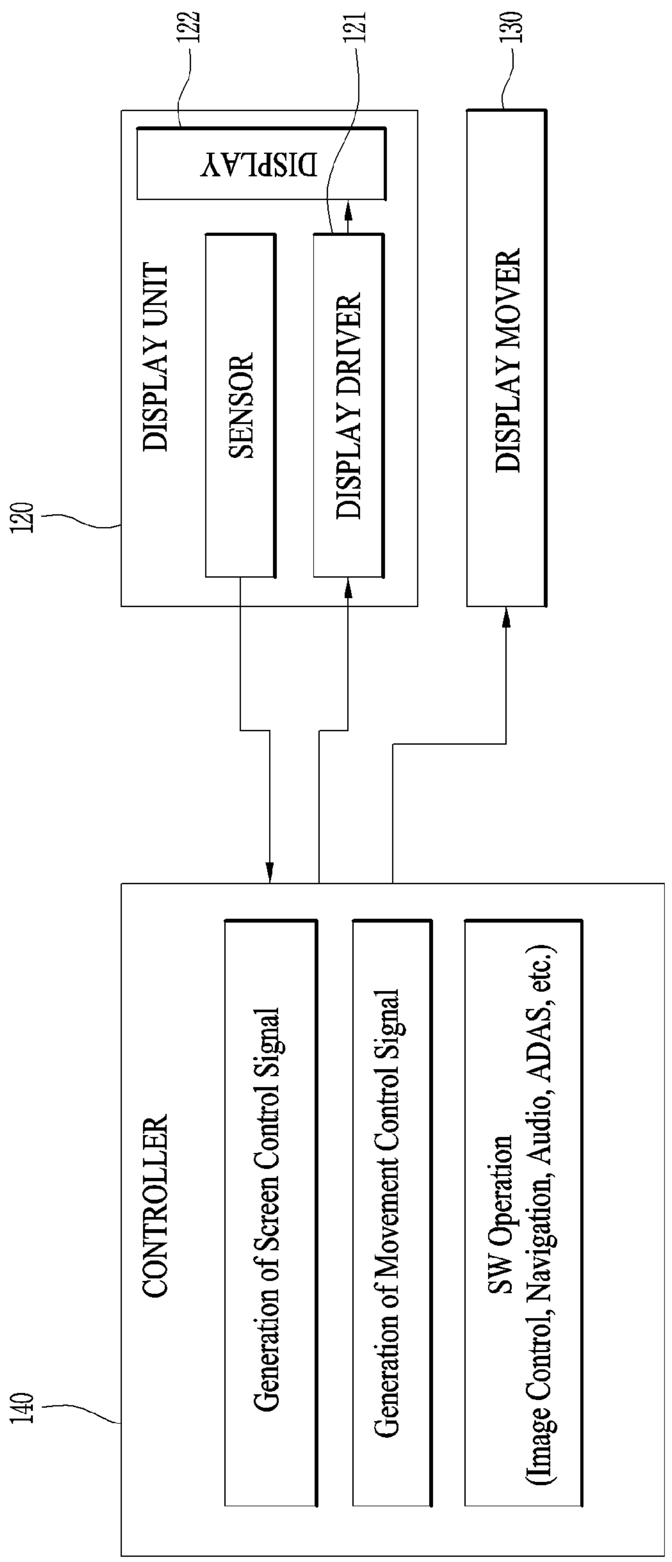
FIG. 3 conceptually illustrates components of a display device according to an embodiment of the present disclosure.

FIG. 3 conceptually illustrates components of the display device 100. In FIG. 3, signal transfer between the controller 140, the display unit 120, and the display mover 130 is illustrated.

The controller 140 of the display device 100 transfers a signal to the display unit 120 and the display mover 130. Specifically, the controller 140 may receive a mode signal selected by the user and transfer a movement control signal corresponding to the mode signal to the display mover 130. The controller 140 may transfer a screen control signal corresponding to the mode signal to the display unit 120.

The display mover 130 may move the display unit 120 according to a mode based on the movement control signal received from the controller 140.

The display unit 120 may control an image output region of the display unit 120 based on the screen control signal transferred by the controller 140.

Referring to FIG. 3, the display unit 120 may include a display 122 and a display driver 121. FIG. 4 illustrates an active region and an inactive region of the display 122.

The display 122 is composed of pixels, and the pixels are arranged horizontally or vertically to configure the screen of the display 122. Here, one line of pixels arranged horizontally is referred to as a horizontal pixel line 122*a*. The display 122 may be represented by a set vertically arranged with a plurality of horizontal pixel lines 122*a*.

Figure 4B:
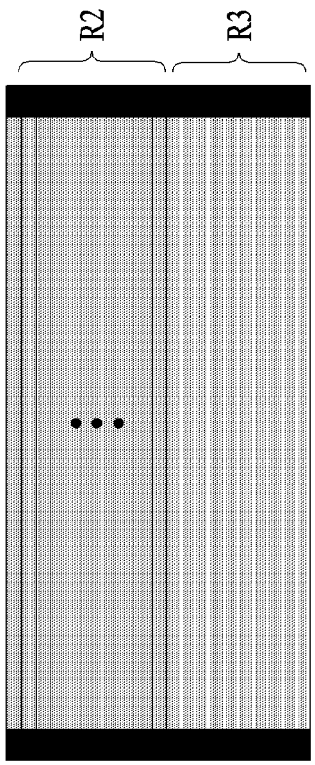
FIGS. 4A-4B illustrate an active region and an inactive region of a display according to an embodiment of the present disclosure.
Figure 4A:
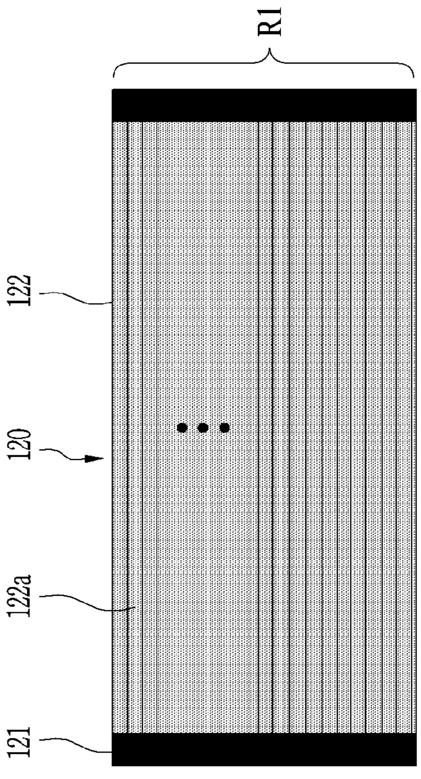

The display driver 121 includes a gate that controls a voltage applied to pixels. More specifically, the display driver 121 includes a plurality of gates that may control a voltage applied to the plurality of horizontal pixel lines 122*a* (FIGS. 4A-4B). One gate may control a voltage applied to one horizontal pixel line. When a voltage is applied to a pixel, the pixel outputs an image by image data corresponding to the pixel. According to a scan rate of the display 122, a voltage is sequentially applied to the plurality of horizontal pixel lines 122*a* to output an image. The display driver 121 may control a plurality of gates based on the screen control signal, so that a voltage is applied to horizontal pixel lines belonging to a specific region of the display 122 to output an image.

FIG. 4A illustrates that an image is output in an entire region R1 of the display 122, and FIG. 4B illustrates that an image is output in a partial region R2 and no image is output in the remaining region R3. In FIG. 4B, since a voltage is not applied to horizontal pixel lines included in the region R3, no image is output.

In FIGS. 4A AND 4B, assuming that the display 122 consists of a set of N horizontal pixel lines, FIG. 4A illustrates that an image is output, for example, on the first to n-th horizontal pixel lines (i.e., the entire horizontal pixel lines included in the region R1), among the first, second, third, . . . , n-th horizontal pixel lines. FIG. 4B illustrates that an image is output, for example, on first to n/2-th horizontal pixel lines (i.e., horizontal pixel lines included in the region R2) and no image is output on (n/2+1)-th to n-th horizontal pixel lines (i.e., horizontal pixel lines included in the region R3).

Whether an image will be output in an arbitrary section of horizontal pixel lines among total horizontal pixel lines may depend on the withdrawal mode of the display unit 120. Depending on the withdrawal mode, a region by which the display unit 120 is exposed to the outside of the casing 110 differs. The display device 100 may output an image on horizontal pixel lines contained in the region by which the display 100 is exposed to the outside of the casing 110.

FIGS. 5, 6A-6C and 7 illustrate exemplary screen control signals according to an embodiment. A screen control signal according to the embodiment may be generated by the controller 140 and transmitted to the display driver 121. The display driver 121 may control image output on a plurality of horizontal pixel lines based on the screen control signal.

Figure 5:
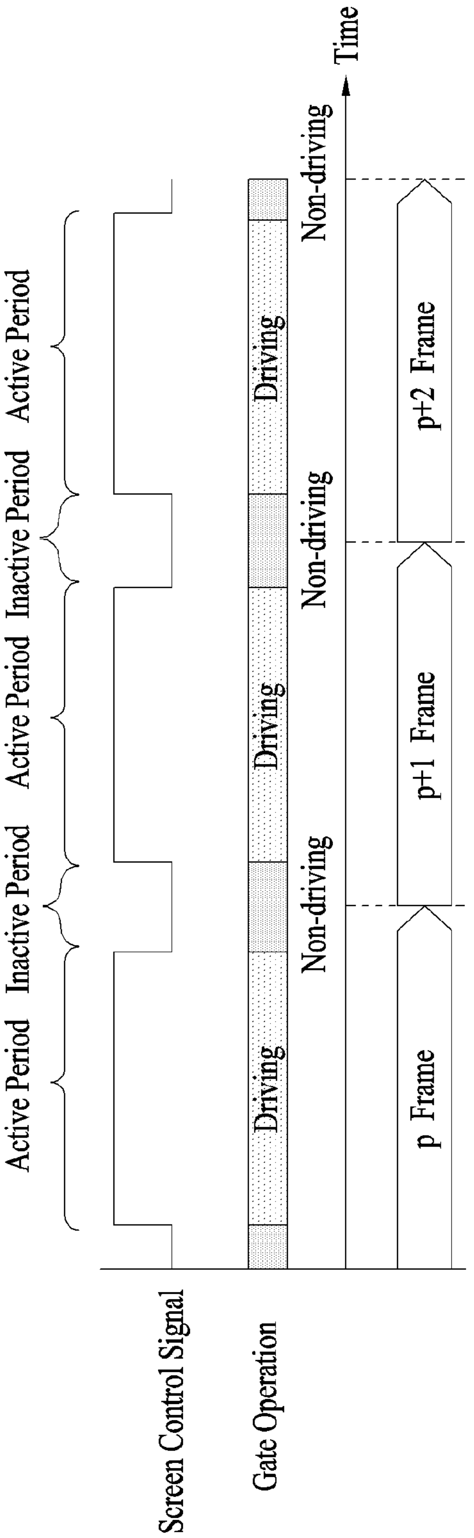
FIG. 5 illustrates an exemplary screen control signal according to an embodiment of the present disclosure.
Figures 6A, 6B, 6C:
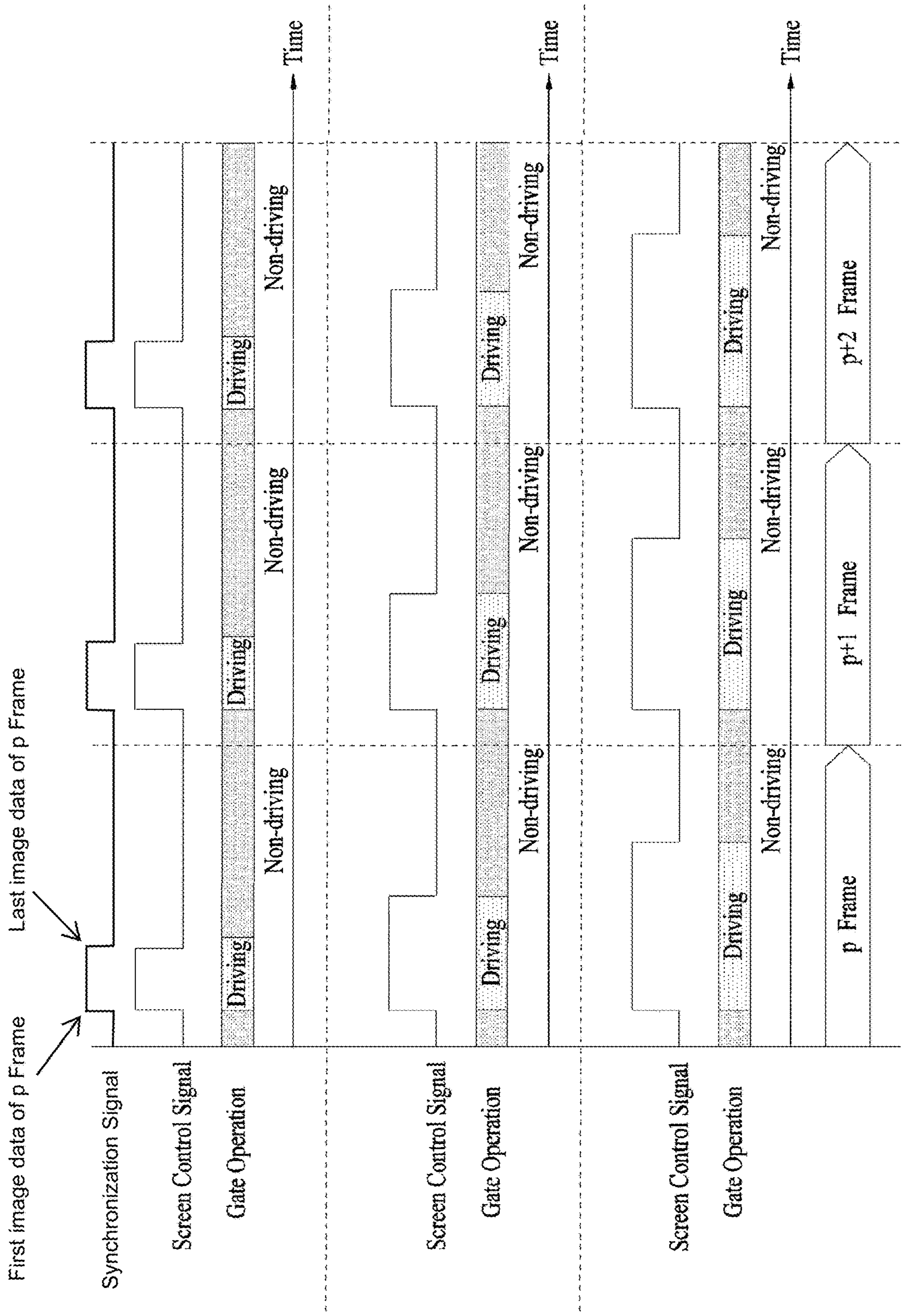
FIGS. 6A-6C illustrate an exemplary screen control signal according to an embodiment of the present disclosure.
Figure 7:
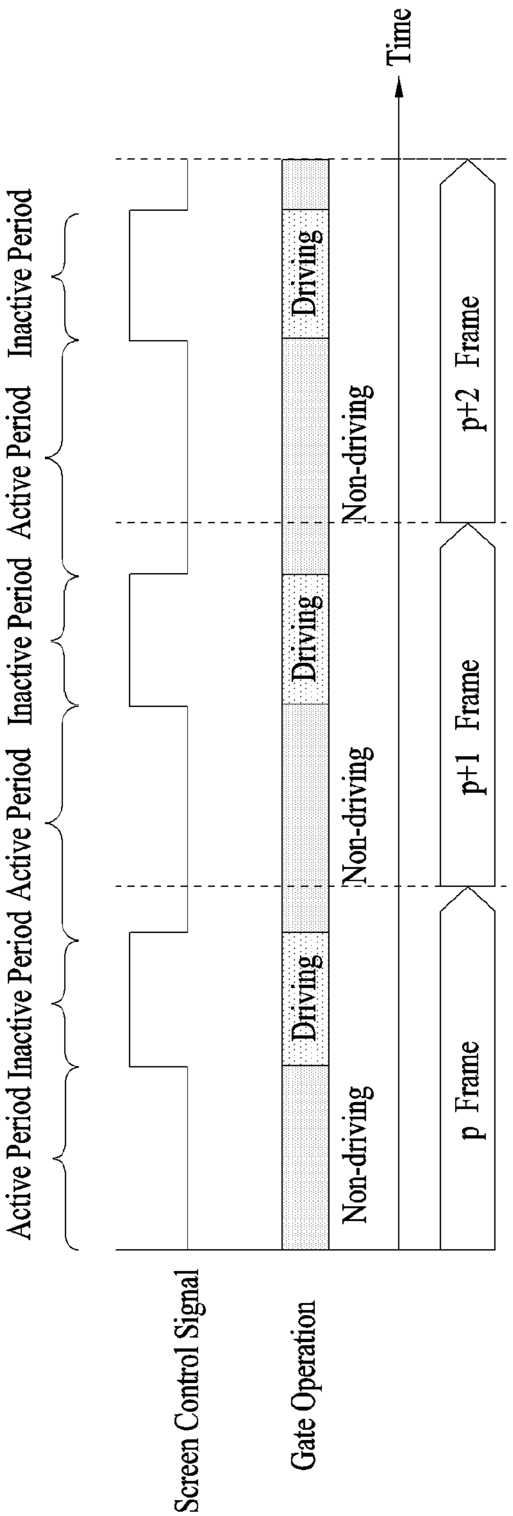
FIG. 7 illustrates an exemplary screen control signal according to an embodiment of the present disclosure.

Referring to FIGS. 5 to 7, the screen control signal includes an active period and an inactive period. The screen control signal repeats the active period and the inactive period over time. In the active period of the screen control signal, a gate applies a voltage to a pixel, and in the inactive period of the screen control signal, the gate does not apply the voltage to the pixel. Multiple gates corresponding to respective horizontal pixel lines are sequentially driven based on a scan rate of the display. In this case, whether to apply a voltage may be determined depending on whether the screen control signal is activated or not.

FIG. 5 illustrates a screen control signal when an image is output on the entire screen of the display 122. In the active period of the screen control signal, a voltage is sequentially applied to the first to n-th horizontal pixel lines of the display 122, so that an image of one frame (e.g., a frame p) is output. After the inactive period for a predetermined time elapses, the active period is started again, and an image of the next frame (e.g., frame p+1) is output on the first to n-th horizontal pixel lines.

FIGS. 6A-6C illustrate screen control signals when an image is output on a partial screen of the display 122. FIGS. 6A, 6B, 6C illustrate different durations of active periods of the screen control signals. In FIG. 6A, the duration of the active period is smallest, and in FIG. 6C, the duration of the active period is longest. Accordingly, in FIG. 6A, since the number of horizontal pixel lines to which a voltage is applied during the duration of the active period is smallest, the image is output in a small region. In FIG. 6C, since the number of horizontal pixel lines to which a voltage is applied during the duration of the active period is large, the image is output in a large region.

In this way, if a starting point of the active period and the duration of the active period vary, horizontal pixel lines on which an image is output (or to which a voltage is applied) in the display 122 differ, a region of the screen in which the image is output may vary.

The controller 140 may transmit the screen control signal to the display unit 120 according to the mode, and the display unit 120 may output an image based on the screen control signal which differs according to each mode. The starting point and duration of the active period of the screen control signal may vary depending on the mode. Therefore, the size and position of a region in which an image is output in the display unit may differ according to the mode.

The starting point of the active period may be based on a synchronization signal. The synchronization signal may be included in image data received by the controller 140 or may be a separate signal. The synchronization signal may be a signal indicating that image data received by the controller 140 is the first image data or the last image data of image data corresponding to one frame. Alternatively, the synchronization signal may be a signal representing image data corresponding to a specific pixel among the image data corresponding to one frame. In this case, the specific pixel may be the first pixel or the last pixel of the display 122. The first pixel may indicate a pixel that outputs the first image data among the image data corresponding to one frame in the display 122. The last pixel may indicate a pixel that outputs the last image data among the image data corresponding to one frame in the display 122. In other words, the synchronization signal may be a signal indicating the order of image data.

The controller 140 may activate the screen control signal based on the synchronization signal. For example, the controller 140 may activate the screen control signal upon receiving the synchronization signal indicating the first image data and deactivate the screen control signal upon receiving the synchronization signal indicating the last image data.

Alternatively, the controller 140 may activate the screen control signal upon receiving the synchronization signal indicating the first image data and deactivate the screen control signal after a certain time (duration of the active period) elapses. In this case, the duration of the active period may indicate the time required to receive all the image data corresponding to one frame. Alternatively, the duration of the active period may represent the time consumed from the time when the first image data among the image data corresponding to one frame is output to the time when the last image data among the image data corresponding to one frame is output.

Alternatively, the duration of the active period may be calculated based on the scan rate of the display 122. For example, if the scan rate of the display 122 is 60 Hz, the output cycle of an image frame is $\frac{1}{60}$ seconds. In other words, the sum of the duration of the active period and the duration of the inactive period within one cycle is $\frac{1}{60}$ seconds. Here, assuming that all horizontal pixel lines of the display 122 will sequentially operate, a time obtained by subtracting the duration of the inactive period (which may be randomly set) from 1/60 seconds becomes the duration (referred to hereinafter as 'A time') of the active period during which an image is output in the entire region. A time (referred to hereinafter as 'B time') consumed to output an image on one horizontal pixel line may be calculated by dividing the A time by the number of horizontal pixel lines. Therefore, the duration of the active period for outputting an image on horizontal pixel lines belonging to a specific region of the display 122 may be calculated by multiplying the number of horizontal pixel lines included in the specific region by the B time.

In addition, the starting point of the active period may be calculated based on the scan rate of the display 122. Since a voltage is cyclically applied to the first horizontal pixel line of the display 122 according to the scan rate, the screen control signal may be activated identically to the cycle.

In the embodiment, while the scan rate has been exemplified as 60 Hz, the starting point and duration of the active period of the screen control signal may be configured according to the above description with respect to various scan rates such as 120 Hz and 144 Hz.

In the display device 100 according to the embodiment, since the area of a region of the display 122 exposed to the outside of the casing 110 differs according to the mode, the number of the horizontal pixel lines included in the exposed region differs according to the mode. Therefore, the duration of the active period according to each mode may be calculated by multiplying the number of horizontal pixel lines included in the exposed region according to the mode by the B time. Thus, the duration of the active period is different for each withdrawal mode of the display unit 120, and all or part of a plurality of horizontal pixel lines may be activated according to the mode.

(a), (b) and (c) of FIG. 6 represent screen control signals in different modes, respectively. The screen control signal has a different ratio of the duration of the active period and the duration of the inactive period in one cycle according to the mode. According to the mode, the duration of the inactive period may be longer than the duration of the active period. Desirably, the duration of the inactive period is less than eight times the duration of the active period. Similarly, the number of horizontal pixel lines deactivated may be larger than the number of horizontal pixel lines activated according to the mode. Desirably, the number of horizontal pixel lines deactivated is less than eight times the number of horizontal pixel lines activated.

FIG. 7 illustrates a screen control signal of another embodiment. According to the screen control signal of FIG. 7, horizontal pixel lines included in a lower region of the display 122 may be activated. That is, image data may be output in a lower direction from horizontal pixel lines located at the middle height of the display 122. The screen control signal as in FIG. 7 may be used when image data is shown to the user only in a lower region of the display unit 120 after the display unit 120 of a foldable type is folded.

Hereinafter, a control method of a display device according to an embodiment will be described. The control method according to the embodiment includes receiving a mode signal of a user by a controller of the display device, transmitting a movement control signal corresponding to the mode signal to a display mover by the controller, and transmitting a screen control signal corresponding to the mode signal to a display unit by the controller.

In this case, the screen control signal includes an active period and an inactive period. The active period or the inactive period is based on a synchronization signal indicating the order of image data. The screen control signal has been described above.

In addition, the control method according to the embodiment may further include moving the display unit based on the movement control signal by the display mover. The operation of moving the display unit may include determining a position of the display unit based on a value measured by a sensor, driving a motor based on the movement control signal, and determining whether the display unit is moved according to the movement control signal based on the value measured by the sensor.

According to embodiments of the present disclosure, since the withdrawal range of the display may be efficiently controlled according to the use of the display screen, the availability of the display device is improved. In addition, since only a display region of a withdrawal range may be output, screen display power is saved. In addition, an image may be output only on pixels of an exposed display region by a simple method. Power is reduced compared to power when a display region which is not exposed is processed in black.

The description of various embodiments of the present disclosure is not limited to the corresponding embodiment, and it is understood that the technical idea of each embodiment applied in various embodiments may be applied to other embodiments.

As described above, the detailed description of the embodiments of the present disclosure has been given to enable those skilled in the art to implement and practice the disclosure. Although the disclosure has been described with reference to the embodiments, those skilled in the art will appreciate that various modifications and variations may be made in the present disclosure without departing from the spirit or scope of the disclosure and the appended claims. For example, those skilled in the art may use constructions disclosed in the above-described embodiments in combination with each other.

Accordingly, the present disclosure should not be limited to the specific embodiments described herein, but should be accorded the broadest scope consistent with the principles and features disclosed herein.

What is claimed is:

1. A display device, comprising:
- a casing having an opening;
- a display unit configured to be inserted into and withdrawn from the casing through the opening;
- a display mover connected to the display unit and configured to move the display unit;
- a sensor configured to measure a distance between a lower portion of the casing and a lower end of the display unit, the distance being in a direction parallel to the direction of insertion and withdrawal of the display unit; and
- a controller configured to transfer a signal to the display mover and the display unit,
- wherein the display unit moves according to a mode so that an area exposed to an outside of the casing differs according to the mode, the mode being determined based on the distance measured by the sensor,
- wherein:
  - the display unit includes a display driver configured to control a plurality of horizontal pixel lines included in a display,
  - the controller transfers a screen control signal to the display driver, and the display driver controls image output of the horizontal pixel lines based on the screen control signal, wherein:

the screen control signal includes an active period and an inactive period, the display driver applies a voltage to a horizontal pixel line based on the screen control signal of an active state, a starting point of the active period differs according to the mode, and a duration of the active period of the screen control signal differs based on the mode and is calculated based on a product of a scan rate for each line of pixels and a number of lines of pixels corresponding to the mode, and wherein:

the active period or the inactive period of the screen control signal is based on a synchronization signal, and the synchronization signal is a signal indicating an order of image data, such that the screen control signal is activated upon receiving the synchronization signal indicating first image data and deactivated upon receiving the synchronization signal indicating last image data.

2. The display device of claim 1, wherein the active period of the screen control signal is started based on the synchronization signal.

3. The display device of claim 1, wherein:

the active period and the inactive period of the screen control signal are repeated over time, the active period is calculated based on a scan rate, n, represented in Hertz, and the screen control signal has a different ratio of the duration of the active period to a duration of the inactive period in one cycle according to the mode.

4. A method of controlling a display device, the method comprising:

receiving, by a controller, a mode signal of a user;

transmitting, by the controller, a movement control signal corresponding to the mode signal to a display mover; and transmitting, by the controller, a screen control signal corresponding to the mode signal to a display unit;

moving the display unit based on the movement control signal by the display mover, wherein the moving the display unit comprises:

determining a position of the display unit based on a value of a distance between a lower portion of a casing containing the display unit and a lower end of the display unit, the distance being in a direction parallel to a direction of movement of the display unit, the distance measured by a sensor, driving a motor based on the movement control signal, and determining whether the display unit is moved according to the movement control signal based on the value measured by the sensor, wherein the screen control signal includes an active period and an inactive period, and the active period or the inactive period are based on a synchronization signal indicating an order of image data, such that the screen control signal is activated upon receiving the synchronization signal indicating first image data and deactivated upon receiving the synchronization signal indicating last image data, and wherein:

a duration of the active period of the screen control signal differs based on a mode corresponding to the mode signal, and the duration is calculated based on a product of a scan rate for each line of pixels and a number of lines of pixels corresponding to the mode.

* * * * *